July 5, 1927.  1,634,280
E. E. ZASTROW
STORAGE BATTERY TERMINAL
Filed Aug. 13, 1926
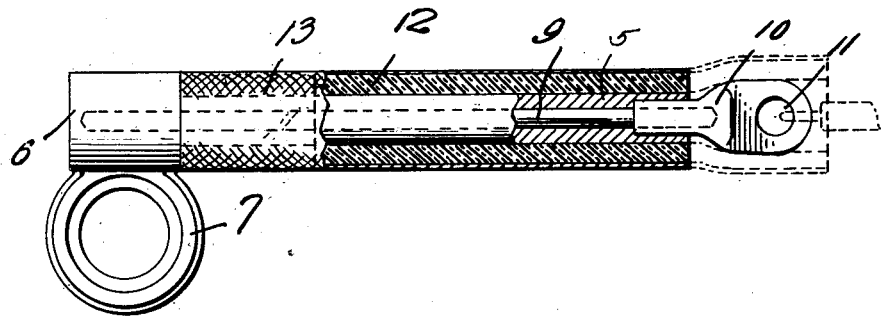
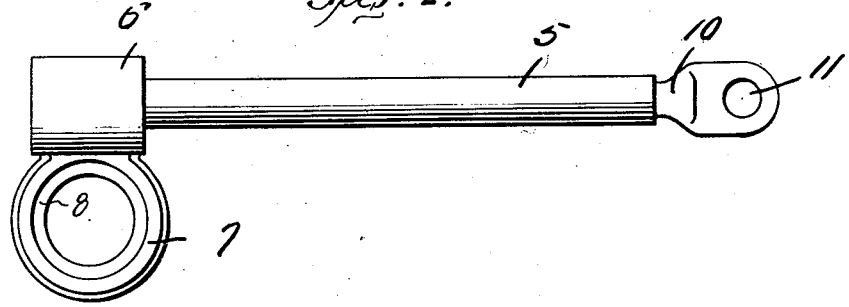
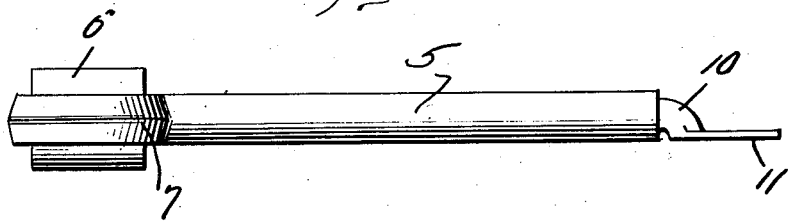
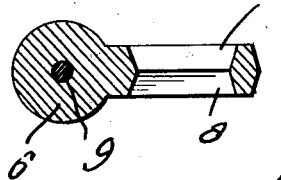
Inventor
Edgar E. Zastrow
By Clarence A. O'Brien
Attorney Patented July 5, 1927.

1,634,280

UNITED STATES PATENT OFFICE.

EDGAR E. ZASTROW, OF CHANUTE, KANSAS.

STORAGE-BATTERY TERMINAL.

Application filed August 13, 1926. Serial No. 129,000.

This invention relates to terminals for storage batteries and has for its primary object to provide a terminal that is so constructed as to permit the same to be soldered to the positive pole of the battery at one end, the terminal being so constructed at its opposite end as to permit of the ready attachment of the lead wire thereto, with the end in view of preventing the corrosion of the positive post of the battery with the which the terminal is associated.

A further object is to provide a terminal for storage batteries of the above mentioned character that is of simple construction and inexpensive of manufacture, and one that will effect a permanent part of the storage battery when associated therewith.

Other objects will become apparent from the following description taken in connection with the accompanying drawing when the same is better understood, the same comprising the novel form, combination, and arrangement of parts hereinafter more fully described, shown in the accompanying drawing and claimed.

In the drawing wherein like numerals indicate like parts:

Figure 1 is a view partly in top plan and partly in cross section of a terminal constructed in accordance with the present invention.

Figure 2 is a similar view of the terminal, the insulating covering therefor being removed.

Figure 3 is a side elevation of the terminal as disclosed in Figure 2, and

Figure 4 is a detail transverse section taken through the battery post attaching end of the terminal.

Now having particular reference to the drawing, my novel terminal constitutes the provision of a suitable length of cast lead 5 that is preferably of circular shape in cross section and that is formed at one end with an enlargement for providing a circular head 6 upon the side of which is formed a lead ring 7 for engagement over the positive pole of the battery after which the same is securely soldered thereto. The interior of this ring 7 is preferably tapered at opposite sides of the center thereof as indicated by the reference characters 8—8 in order that spaces will be provided at the top and bottom sides of this ring between the ring and battery post for permitting the lead solder to engage therein with the result that a positive and permanent solder is secured between the ring and said post.

During the casting of the said length of lead 5 as well as its head 6 there is formed entirely through the length 5 as well as partially through the head 6 a predetermined length of copper wire 9, while also during the casting of the lead around the wire there is associated with the end of the wire remote from the pole attaching ring 7 a conventional form of copper lug 10 that is of plano shape at its outer end and provided with an opening 11 to facilitate the connection of the lead wire to the terminal.

Disposed loosely upon the length of cast lead 5 between its head 6 and its opposite end thereof is a rubber insulating covering 12 that may be slid away from the head 6 over the copper lug 10 after the lead wire has been attached thereto for obviously insulating the joint therebetween. A cloth or other fabric covering indicated by the numeral 13 is arranged over the rubber insulating covering 12.

It will thus be seen that I have provided a highly novel, simple and efficient form of battery post terminal that is well adapted for all the purposes heretofore designated, and even though I have herein shown and described the invention as consisting of certain detailed structural elements it is nevertheless to be understood that some changes may be made therein without affecting the spirit and scope of the appended claims.

Having thus desired the invention, what I claim as new and desire to secure by Letters Patent is:—

1. In a battery terminal of the character described, a suitable length of cast lead, a battery post engaging ring upon one end of said length of lead, an electric conducting wire extending throughout the length of the cast lead, and a lead wire attaching lug molded within the lead in engagement with said conducting wire at the opposite end from said post engaging ring.

2. In a battery terminal of the character described, a suitable length of cast lead, a battery post engaging ring upon one end of said length of lead, an electric conducting wire extending throughout the length of the cast lead, a lead wire attaching lug molded within the lead in engagement with said conducting wire at the opposite end of said post engaging ring, and a non-conducting covering loosely arranged upon the length of cast lead for engagement over the lead wire attaching lug when a lead wire has been secured thereto.

3. In a battery terminal of the character described, a suitable length of cast lead forming at one end with an enlarged head, a battery post engaging ring formed upon the side of the head, an electric conducting wire extending throughout the length of cast lead and extending at one end into said head, and a lead wire attaching lug molded within the opposite end of the lead in engagement with said conducting wire.

4. In a battery terminal of the character described, a suitable length of cast lead formed at one end with an enlarged head, a battery post engaging ring formed upon the side of the head, an electric conducting wire extending throughout the length of cast lead and extending at one end into said head, a lead wire attaching lug molded within the opposite end of the lead in engagement with said conducting wire, and a conducting covering loosely arranged upon the length of cast lead for engagement over the lead wire attaching lug when a lead wire has been secured thereto.

In testimony whereof I affix my signature.

EDGAR E. ZASTROW.